(12) United States Patent
Den Breejen et al.

(10) Patent No.: US 10,901,142 B2
(45) Date of Patent: *Jan. 26, 2021

(54) INTERCONNECTABLE LIGHT GUIDE TILES WITH OPPOSING CURVED SURFACES

(71) Applicant: Lumileds LLC, San Jose, CA (US)

(72) Inventors: Jeroen Den Breejen, South Lyon, MI (US); Frederic Stephane Diana, Santa Clara, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,310

(22) Filed: May 6, 2020

(65) Prior Publication Data
US 2020/0264363 A1 Aug. 20, 2020

Related U.S. Application Data

(63) Continuation of application No. 15/700,517, filed on Sep. 11, 2017, now Pat. No. 10,677,980.
(Continued)

(51) Int. Cl.
*F21V 8/00* (2006.01)
*F21V 21/005* (2006.01)
(Continued)

(52) U.S. Cl.
CPC .......... *G02B 6/0073* (2013.01); *F21V 21/005* (2013.01); *F21V 23/06* (2013.01);
(Continued)

(58) Field of Classification Search
CPC .... G02B 6/002; G02B 6/0021; G02B 6/0023; G02B 6/0028; G02B 6/0078; G02B 6/008; G02B 6/12016
See application file for complete search history.

(56) References Cited

U.S. PATENT DOCUMENTS

| 7,358,929 B2 | 4/2008 | Mueller et al. |
| 7,798,681 B2 | 9/2010 | Wang et al. |

(Continued)

FOREIGN PATENT DOCUMENTS

| CN | 101368686 A | 2/2009 |
| CN | 102081187 A | 6/2011 |

(Continued)

OTHER PUBLICATIONS

"U.S. Appl. No. 15/700,517, Advisory Action dated Mar. 4, 2019", 3 pgs.

(Continued)

*Primary Examiner* — Diane I Lee
*Assistant Examiner* — Keith G. Delahoussaye
(74) *Attorney, Agent, or Firm* — Schwegman Lundberg & Woessner, P.A.

(57) ABSTRACT

Interlocking light emitting diode ("LED") light guide tiles are disclosed. The tiles have interlocking edge features that provide physical interlock fitting between tiles and present a continuous appearance, both in an "on," where LEDs are powered on and emitting light state and an "off" state, where LEDs are powered off and not emitting light. The LED light guide tiles interface with LEDs (housed in or embodied as integrated circuit LED packages) to output light through the surfaces of the light guide. The interlocking edge features of the light guide tiles are shaped to obscure or block an image of the LED packages from being seen by observers looking at the light guide tiles. Light guide tile assemblies or installations can be easily formed out of interchangeable tiles with little or no requirement for relative directional alignment of the tiles.

20 Claims, 5 Drawing Sheets

Related U.S. Application Data

(60) Provisional application No. 62/393,229, filed on Sep. 12, 2016.

(51) Int. Cl.
*F21V 23/06* (2006.01)
*F21Y 115/10* (2016.01)
*F21S 2/00* (2016.01)

(52) U.S. Cl.
CPC ............ *G02B 6/002* (2013.01); *G02B 6/0018* (2013.01); *G02B 6/0078* (2013.01); *F21S 2/005* (2013.01); *F21V 2200/20* (2015.01); *F21Y 2115/10* (2016.08)

(56) References Cited

U.S. PATENT DOCUMENTS

| | | |
|---|---|---|
| 8,192,066 B2 | 6/2012 | Deurenberg et al. |
| 8,469,577 B2 | 6/2013 | Kang et al. |
| 8,696,184 B2 | 4/2014 | Morino et al. |
| 8,721,149 B2 | 5/2014 | Holman et al. |
| 8,755,005 B2 | 6/2014 | Bierhuizen et al. |
| 8,956,038 B2 | 2/2015 | Kusuura |
| 9,217,895 B2 | 12/2015 | Yeo et al. |
| 2007/0171678 A1 | 7/2007 | Shim et al. |
| 2007/0247871 A1 | 10/2007 | Yoo |
| 2008/0019139 A1 | 1/2008 | Dubosc et al. |
| 2008/0260328 A1 | 10/2008 | Epstein |
| 2009/0290093 A1 | 11/2009 | Shimura et al. |
| 2010/0046242 A1 | 2/2010 | Lambert et al. |
| 2011/0001693 A1 | 1/2011 | Kim et al. |
| 2011/0187636 A1 | 8/2011 | Suzuki |
| 2011/0235308 A1 | 9/2011 | Kang et al. |
| 2012/0014134 A1 | 1/2012 | Fang et al. |
| 2012/0033441 A1 | 2/2012 | Sousek et al. |
| 2012/0134179 A1 | 5/2012 | Que |
| 2012/0140436 A1 | 6/2012 | Yang et al. |
| 2013/0114293 A1 | 5/2013 | Morino et al. |
| 2014/0233237 A1* | 8/2014 | Lutian ................ G02B 19/0061 362/257 |
| 2015/0241616 A1 | 8/2015 | Bungenstock |
| 2018/0074256 A1 | 3/2018 | Den Breejen et al. |

FOREIGN PATENT DOCUMENTS

| | | |
|---|---|---|
| CN | 103104862 A | 5/2013 |
| CN | 105425334 A | 3/2016 |
| CN | 110192062 A | 8/2019 |
| EP | 2299161 A1 | 3/2011 |
| EP | 2369373 A1 | 9/2011 |
| JP | 2007-200885 A | 8/2007 |
| JP | 2010-531034 A | 9/2010 |
| JP | 2013-101858 A | 5/2013 |
| TW | 201814925 A | 4/2018 |
| WO | WO-2008102655 A1 | 8/2008 |
| WO | WO-2013156905 A1 | 10/2013 |
| WO | WO-2018049307 A1 | 3/2018 |

OTHER PUBLICATIONS

"U.S. Appl. No. 15/700,517, Corrected Notice of Allowability dated Mar. 16, 2020", 2 pgs.
"U.S. Appl. No. 15/700,517, Final Office Action dated Nov. 14, 2019", 11 pgs.
"U.S. Appl. No. 15/700,517, Final Office Action dated Dec. 11, 2018", 21 pgs.
"U.S. Appl. No. 15/700,517, Non Final Office Action dated Apr. 18, 2019", 23 pgs.
"U.S. Appl. No. 15/700,517, Non Final Office Action dated May 31, 2018", 22 pgs.
"U.S. Appl. No. 15/700,517, Notice of Allowance dated Jan. 31, 2020", 9 pgs.
"U.S. Appl. No. 15/700,517, Response filed Jan. 14, 2020 to Final Office Action dated Nov. 14, 2019", 11 pgs.
"U.S. Appl. No. 15/700,517, Response filed Feb. 11, 2019 to Final Office Action dated Dec. 11, 2018", 11 pgs.
"U.S. Appl. No. 15/700,517, Response filed Mar. 11, 2019 to Advisory Action dated Mar. 4, 2019", 11 pgs.
"U.S. Appl. No. 15/700,517, Response filed Aug. 31, 2018 to Non Final Office Action dated May 31, 2018", 11 pgs.
"U.S. Appl. No. 15/700,517, Response filed Aug. 19, 2019 to Non-Final Office Action dated Apr. 18, 2019", 10 pgs.
"International Application Serial No. PCT/US2017/050917, International Preliminary Report on Patentability dated Mar. 21, 2019", 7 pgs.
"International Application Serial No. PCT/US2017/050917, International Search Report dated Nov. 8, 2017", 4 pgs.
"International Application Serial No. PCT/US2017/050917, Written Opinion dated Nov. 8, 2017", 5 pgs.
"Japanese Application Serial No. 2019-514002, Voluntary Amendment filed May 15, 2019", w/ English Translation, 6 pgs.
"Korean Application Serial No. 10-2019-7010598, Amendment filed May 9, 2019", w/ English Translation, 8 pgs.
"Chinese Application Serial No. 201780069764.8, Office Action dated Oct. 30, 2020", (w/ English Translation), 16 pgs.
"Taiwanese Application Serial No. 106131229, Office Action dated Nov. 4, 2020", (w/ English Translation), 6 pgs.
"Japanese Application Serial No. 2019-514002, Notification of Reasons for Refusal dated Oct. 20, 2020", (w/ English Translation), 11 pgs.

* cited by examiner

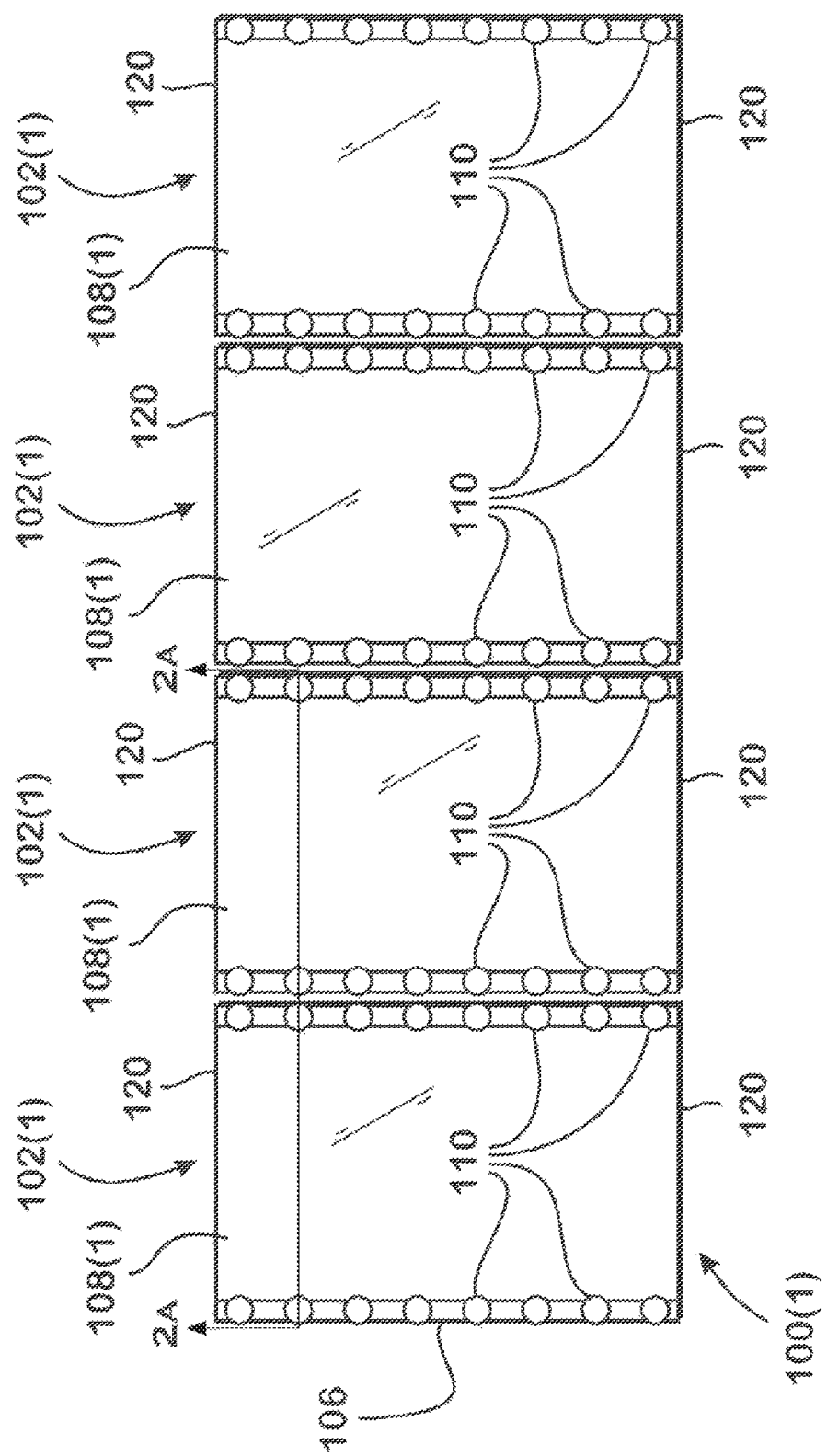

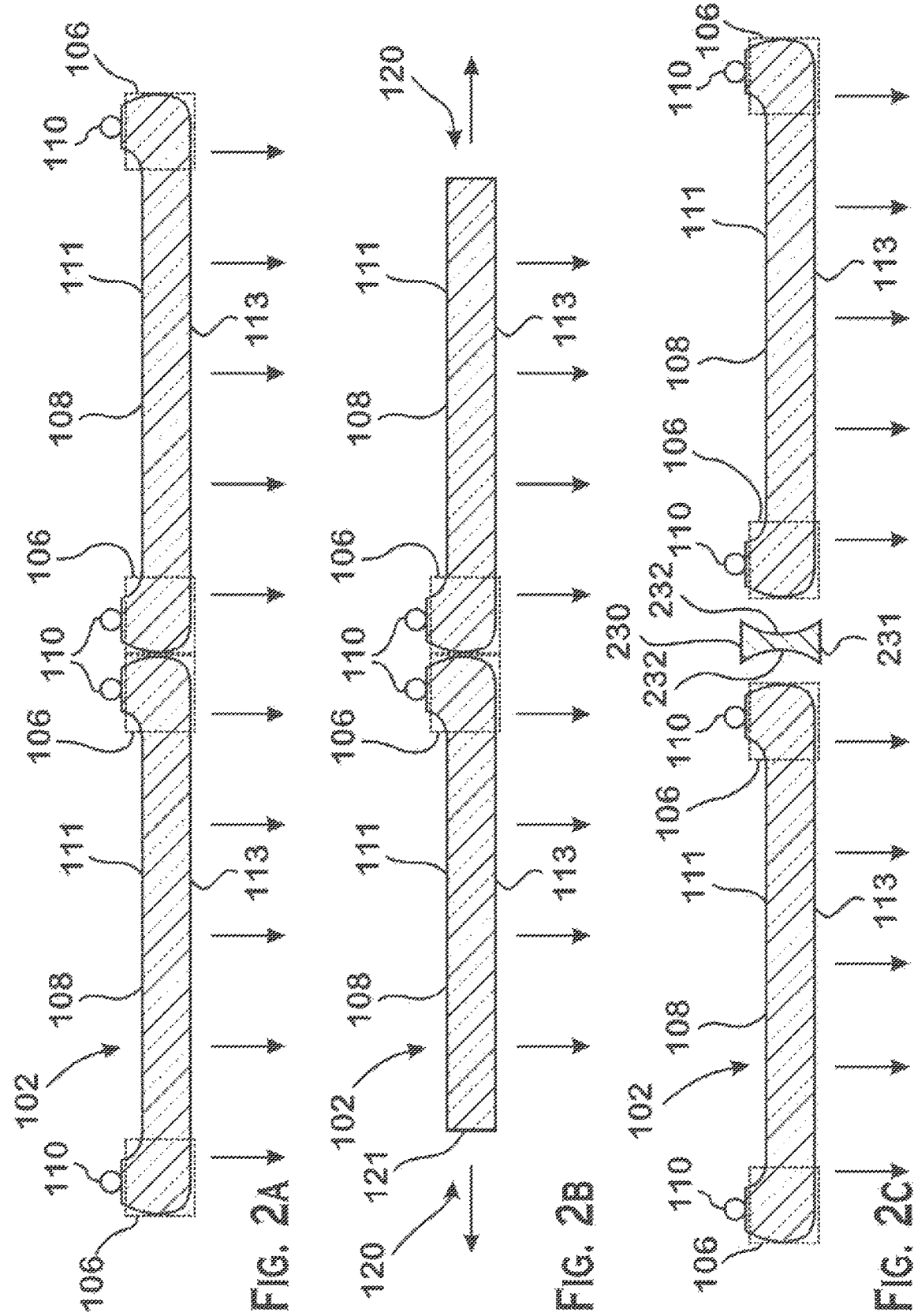

INTERCONNECTABLE LIGHT GUIDE TILES WITH OPPOSING CURVED SURFACES

CROSS REFERENCE TO RELATED APPLICATION

This is a continuation of U.S. application Ser. No. 15/700,517, filed Sep. 11, 2017, which application claims the benefit of U.S. Provisional Patent Application No. 62/393,229, filed Sep. 12, 2016, each of which is incorporated by reference as if fully set forth.

BACKGROUND

Lighting fixtures using light emitting diodes ("LEDs") provide several benefits in comparison with legacy lighting technologies such as reduced power requirements, smaller light sources, flexibility of lighting arrangements, and other benefits. Due to the physical characteristics of LEDs, such as the fact that LEDs are embodied as small integrated circuit packages that are shaped and sized very differently than other types of lighting, new ways of packing LEDs (e.g., lighting fixtures, light guides, or the like) are constantly being developed.

SUMMARY

An LED module is provided. The LED module includes an edge portion including an LED package. The LED module also includes a flat interior portion formed integrally with the edge portion, the flat interior portion including no LED packages and comprising a light guide receiving light from the edge portion including the LED package. The edge portion is configured to physically and optically mate with a corresponding edge portion of a second LED module and to emit at least a portion of the light emitted by the LED package to provide a continuous luminous appearance from the LED module and the second LED module.

An LED assembly is provided. The LED assembly includes a plurality of LED modules interlocked together to form a luminescent panel. An LED of the plurality of LED modules includes an edge portion including an LED package. An LED of the plurality of LED modules includes a flat interior portion formed integrally with the edge portion, the flat interior portion including no LED packages and comprising a light guide receiving light from the edge portion including the LED package. The edge portion is configured to physically and optically mate with a corresponding edge portion of a second LED module of the plurality of LED modules and to emit at least a portion of the light emitted by the LED package to provide a continuous luminous appearance from the LED module and the second LED module.

A frame-supported LED assembly is provided. The frame-supported LED assembly includes a plurality of LED modules interlocked together to form a luminescent panel. An LED module of the plurality of LED modules includes an edge portion including an LED package. The LED module also includes a flat interior portion formed integrally with the edge portion, the flat interior portion including no LED packages and comprising a light guide receiving light from the edge portion including the LED package. The edge portion is configured to physically and optically mate with a corresponding edge portion of a second LED module of the plurality of LED modules and to emit at least a portion of the light emitted by the LED package to provide a continuous luminous appearance from the LED module and the second LED module. The frame has a cross section shaped to mate with edge portions of the LED modules of the plurality of LED modules to thereby support the plurality of LED modules.

BRIEF DESCRIPTION OF THE DRAWINGS

FIGS. 1A-1C illustrate example light guide tile assemblies;

FIGS. 2A-2C are cross-sectional views that illustrate aspects of the light guide tile assemblies, according to examples;

DETAILED DESCRIPTION

Interlocking light emitting diode ("LED") light guide tiles are disclosed. The tiles have interlocking edge features that provide the ability to physically interlock different tiles. The interlocking edge features are also shaped to present a continuous visual appearance between interlocked tiles, both in an "on" state, where LEDs are powered on and emitting light and an "off" state, where LEDs are powered off and not emitting light.

The LED light guide tiles include LEDs that output light through various surfaces of the light guide tiles. The interlocking edge features of the light guide tiles are shaped to obscure or block an image of the LED packages from being seen by observers looking at the light guide tiles. Thus the LED packages—the actual source of generated light—are not visible to an outside observer.

In various embodiments, little or no seam is visible between different tiles in either or both of the "on" state or the "off" state due to the shape of the interlocking edge features and the manner in which light generated by the LED packages is coupled into the light guide tiles. Various tile shapes and edge feature configurations are illustrated, but it should be understood by those of skill in the art that other shapes and edge feature configurations are within the scope of the present disclosure.

Various embodiments of LED modules and LED assemblies are shown and described. Generally, these embodiments include substantially slim, flat tiles that can be combined and interlocked to form flat assembly panels, also referred to as light guide tile assemblies or LED assemblies. The tiles can have any of a large variety of geometries in order to impart a desired shape to a light guide tile assembly when assembled. Although specific geometries are illustrated herein, it should be understood that the teachings provided herein, including LED assemblies formed from tiles having edge portions with LED packages, can be used to create LED assemblies having any desired shape. In some assembly shapes, light guide tile assemblies or installations can be easily formed out of the interchangeable light guide tiles with little or no requirement for relative directional alignment of the tiles. For example, if a square or rectangular LED assembly shape is desired, light guide tiles having a square shape can be combined with little or no regard to relative directionality of the tiles.

Figure 1B:
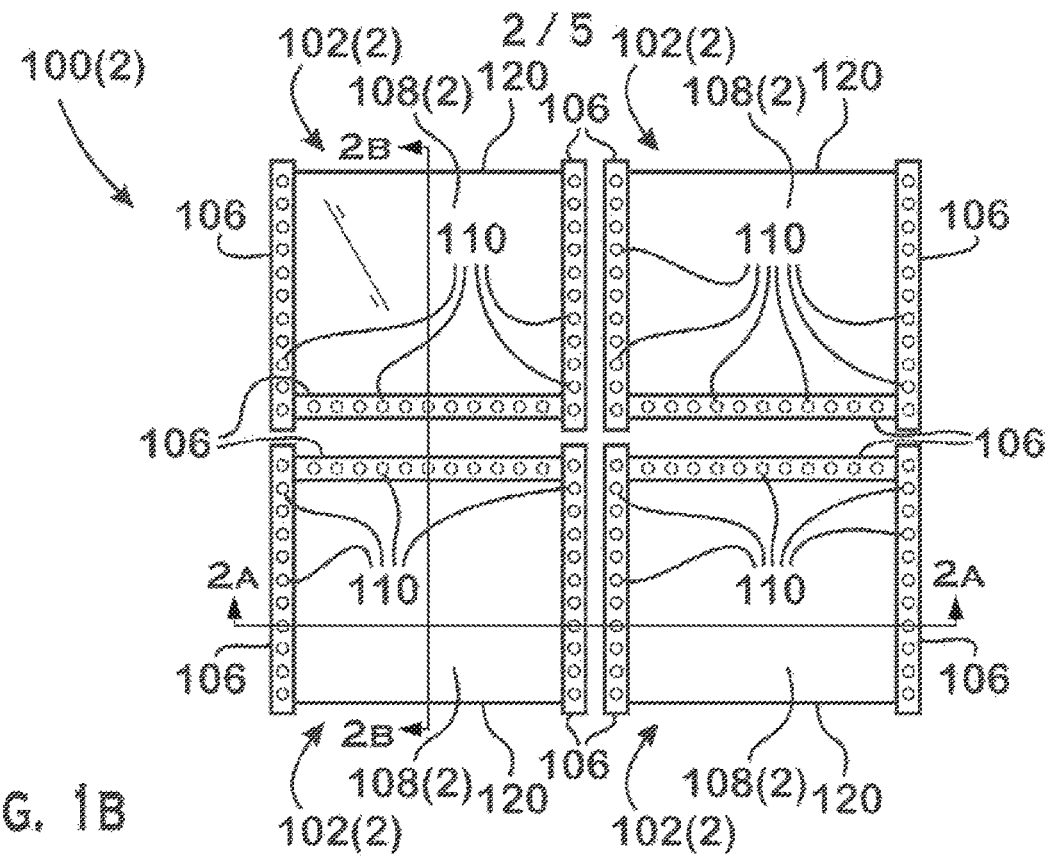
Figure 1C:
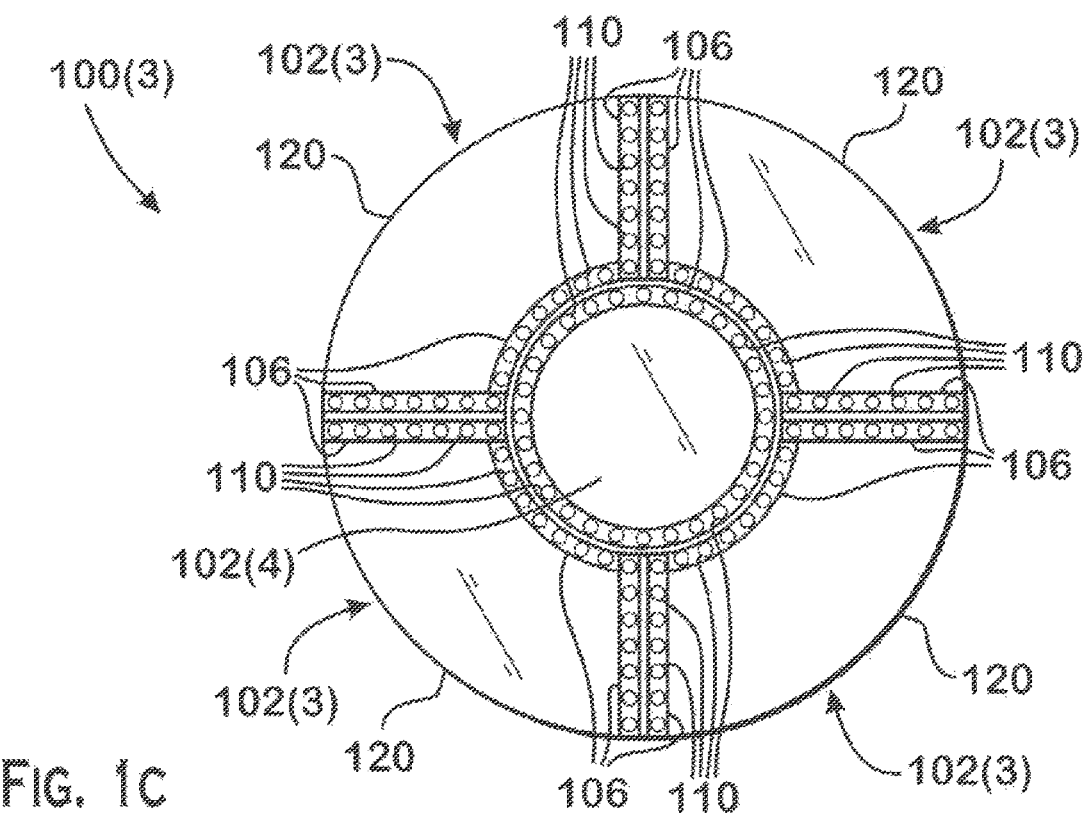

FIGS. 1A-1C illustrate several example light guide tile assemblies (also referred to as "LED" assemblies 100). FIG. 1A illustrates a linear rectangular LED assembly 100(1) comprised of multiple rectangular LED modules 102(1). Each rectangular LED module 102(1) has two curved peripheral portions 106 and an internal portion 108. LED packages 110, which include light emitting diodes, are optically coupled to the LED modules 102 at the curved peripheral portions 106. End portions 120, represent edges of the LED modules 102(1) that include no coupled LED packages 110.

The curved peripheral portions 106 are shaped to obscure the image of the LED packages 110 to an observer. The curved peripheral portions 106 are also shaped to emit homogenized light from the LED packages 110 and to reflect at least some of that light to the internal portions 108 of the LED modules 102 for emission therefrom, also in a homogenized fashion. Homogenized emission of light by the curved peripheral portions 106 and the internal portions 108 of the LED modules 102(1) provides an appearance of uniform illumination from each LED module 102 and also allows a linear arrangement of such LED modules 102(1) to appear as a single contiguous homogenous light source. Additional details of the interface between curved peripheral portions 106 of the LED modules 102 are provided elsewhere herein, including in FIG. 2A and in related discussion.

Although specific numbers of elements, including LED modules 102 and LED packages 110, are illustrated in FIG. 1A, it should be understood that variations in numbers of such elements are within the scope of the present disclosure and may be made for any reason such as to improve illumination intensity, illumination uniformity, or any other feature of LED assembly 100(1). Each LED module 102(1) also includes two end portions 120 (top and bottom edges in FIG. 1A) that include no LED packages 110.

FIG. 1B illustrates another example LED assembly 100 (2) that includes a two-dimensional arrangement of LED modules 102(2). The LED modules 102(2) that make up the LED assembly 100(2) are rectangular in shape and each include three curved peripheral portions 106 and one end portion 120. To provide the appearance of a continuous light emitting surface, LED modules 102(2) are joined together with curved peripheral portions 106 facing each other. The end portions 120 point outward from the LED assembly 100(2). Note that although the left and right sides are illustrated as having curved peripheral portions 106 with LED packages 110, those sides may alternatively have end portions 120 with fewer or substantially no LED packages 110. With curved peripheral portions 106 on left and right sides, the LED assembly 100(2) can be extended in the left or right direction to any length with the addition of more LED modules 102(2). Although a particular number of LED modules 102(2) is illustrated in FIG. 1B, it should be understood that a varied number of rows or columns of LED modules 102(2) would fall under the teachings of the present disclosure. Other changes in geometry of the LED assembly 100(2) are within the scope of the present disclosure as well.

FIG. 1C illustrates another example LED assembly 100 (3) having LED modules 102 shaped to create a circular shape. The LED assembly 100(3) includes four LED modules 102(3) that are each shaped as a quarter of a ring. Within the LED assembly 100(3), these four LED modules 102(3) are arranged in a ring shape. The LED assembly 100(3) also includes an interior circular LED module 102(4) that fills the space of the ring formed by the four LED modules 102 in the LED assembly 100(3).

The quarter-ring LED modules 102(3) each include two curved peripheral portions 106 at the ends (i.e., ends in the tangential direction—the direction that follows the circular path defined by the ring) to provide a continuity of luminescence at the borders between the quarter-ring LED modules 102(3). The quarter-ring LED modules 102(3) also each include two curved peripheral portions 106 at interior edges to mate with the curved peripheral portions 106 of the interior circular LED module 102(4). External edges of the quarter-ring LED modules 102(3) are end portions 120 and do not have LED packages 110.

FIGS. 2A and 2B are cross-sectional views that illustrate aspects of LED assemblies 100, according to an example. FIG. 2A is a cross-sectional view that illustrates two neighboring LED modules 102, where opposing sides of the two neighboring LED modules 102 have curved peripheral portions 106. In one example, FIG. 1A includes at least two LED modules 102(1) positioned side-by-side, with curved peripheral portions 106 mating with each other. FIG. 2A illustrates a cross-section of two such LED modules 102(1) (for example, as denoted by line 2A-2A). In another example, FIG. 2A illustrates a cross-section of two LED modules 102(2) taken along lines 2A-2A of FIG. 1B. Each of the LED modules 102 shown can be different ones of the modules of FIGS. 1A-1C (for example, LED module 102(1) or LED module 102(2)), and so the reference number used to refer to the LED module in FIG. 2A is 102 without the parenthetical.

As illustrated, the cross-section of the LED module 102 includes the internal portion 108 having top surface 111 and bottom surface 113 that are substantially flat, as well as the curved peripheral portions 106 previously described herein. In some embodiments, the bottom surface 113 of the internal portion 108 is intended to face observers and objects to be illuminated. In such embodiments, the top surface 111 of the internal portion 108 faces away from observers and faces a mounting surface such as a wall, ceiling, fixture, or the like. In other embodiments, the top surface 111 and bottom surface 113 face other objects.

The curved peripheral portion 106 curves upwards in the direction of the top surface 111. One or more LED packages 110, including a light emitting diode, are disposed on or near the curved peripheral portion. The LED package 110 is optically coupled to the curved peripheral portion and provides light into the LED module 102. The curved peripheral potion 106 is shaped to obscure the image of the LED package 110 and to reflect and distribute the light from the LED package 110 into the LED module 102 so that the light is able to exit from the bottom surface 113 of the internal portion 108 of the LED module 102. These tasks are accomplished through total internal reflection of the light by the shape of the curved peripheral portion 106.

FIG. 2B illustrates a cross-sectional view of two neighboring LED modules 102, each of which has a curved peripheral portion 106 and an end portion 120. The two curved peripheral portions 106 are facing each other and are shaped as described elsewhere herein. The end portions 120 include end surfaces 121. The end surfaces 121 may be surface treated to couple at least some light out or may be substantially fully reflective to reflect light back in to the LED module 102 for coupling out through bottom surfaces 113. FIG. 2B illustrate the cross-section taken along lines 2B-2B of FIG. 1B and may also represent the cross-section of two neighboring LED modules 102 arranged to have opposing end portions 120.

FIG. 2C illustrates a cross-sectional view of an alternate embodiment in which optical couplers 230 are located between curved peripheral portions 106 of neighboring LED modules 102, according to an example. The optical coupler 230 includes mating surfaces 232 shaped to physically mate with the curved peripheral portions 106 of the LED modules 102. To mate, the mating surfaces 232 may be substantially or fully complementary of the shape of the curved peripheral portions 106. The optical couplers 230 serve to improve the optical interface between LED modules 102, coupling light from one into another, which improves light emission characteristics of the LED modules 102. Bottom surfaces 231 of the optical couplers 230 may also be configured (e.g., with appropriate surface treatment such as a roughening of the bottom surface 231) to couple some light downward to present a continuous luminous appearance between LED modules 102 and optical couplers 230.

The optical couplers 230 may be embodied as a frame disposed between the curved peripheral portions 106 of the LED modules 102. FIG. 2D provides an orthographic view of at least a section of an optical coupler 230 that comprises at least a portion of a frame that supports LED modules 102, according to an example. As shown, the optical coupler 230 is an elongated member having a profile that matches curved peripheral portions 106 of LED modules 102. Although illustrated as having a particular three-dimensional shape, it should be understood that an optical coupler 230 frame could be made having any three-dimensional shape that would act as a frame to support LED modules 102 of various shapes. In one example, an optical coupler 230 frame would include multiple elongated members having the cross-sectional shape as illustrated and disposed in gaps between LED modules 102(1) of FIG. 1A. In a variation, such a frame would also include peripheral sections disposed around the perimeter of the LED assembly 100(1). In such a situation, outward-facing portions of the optical coupler 230 frame may have a mating surface 232 as illustrated or may have some other surface shape, while inward-facing portions may have a mating surface 232 shaped to mate with the curved peripheral portions or other edge shape of the LED modules 102. In another example, the optical coupler 230 frame is shaped to fit in between the LED modules 102(2) of FIG. 1B, and, optionally, around the periphery of the LED assembly 100(2). In yet another example, such a frame may be shaped to fit in between the LED modules 102 of FIG. 1C and, optionally, around the periphery of LED assembly 100(3). It should be understood that the teachings herein contemplate a frame shaped to hold LED modules 102 of any technically feasible shape, where the frame may or may not having mating surfaces that are complementary to the end portions (e.g., curved peripheral portions 106) of the LED modules 102.

Figure 2E:
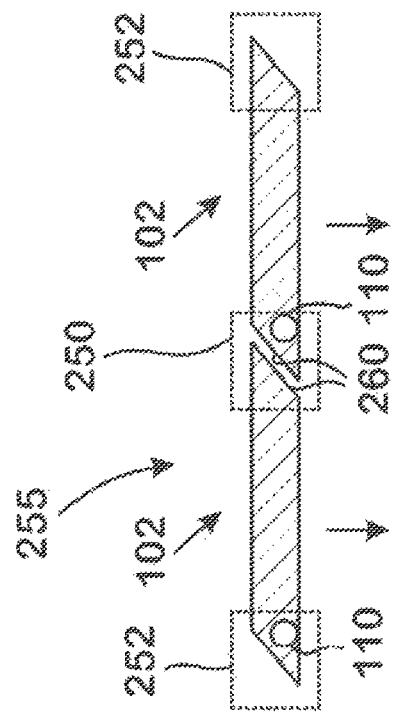
FIGS. 2E-2F are cross-sectional views illustrating an angled-surface overlapping interface of LED modules, according to an example.
Figure 2F:
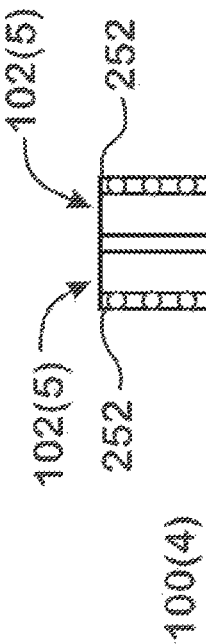
Figure 2D:
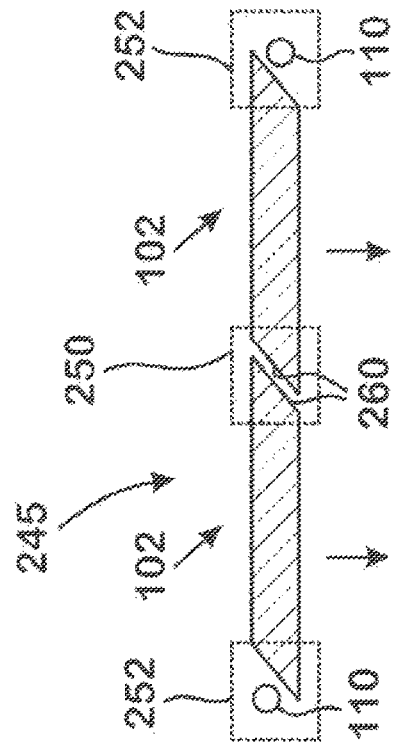
FIG. 2D is an orthographic view of an optical coupler to be used in a light guide tile assembly, according to an example.

FIGS. 2E and 2F are cross-sectional views illustrating an overlapping interface between LED modules 102 and angled, rather than edge-profiled, surfaces for in-coupling light from LED packages 110. In the configuration illustrated in FIGS. 2E and 2F, the LED modules 102 have edges that are angled. Interface between the LED modules occurs at the angled mating surfaces 260. These angled mating surfaces 260 are shaped to overlap one another in order to provide a seamless-appearing transition.

In the external LED angled configuration assembly 245 of FIG. 2E, the two LED modules 102 illustrated have LED packages 110 that are external but proximate to the angled surfaces at the end of the LED modules 102. These LED packages 110 couple their light into the LED modules 102 via those angled surfaces. Light may also be transferred from one LED module 102 to another LED module 102 via the angled mating surfaces 260 at the mated overlap end 250.

In the internal LED angled configuration assembly 255 of FIG. 2F, an alternative embodiment to FIG. 2E in which the LED packages 110 are more closely integrated with the LED modules 102 is provided. Specifically, the LED packages 110 are illustrated as being located within the cross-sectional area of the LED modules 102. In some embodiments, a cutout portion or well exists in the LED modules 102 and the LED package 110 is disposed within that cutout portion. In other embodiments, the LED package 110 is disposed within the body of the LED module 102 (i.e., within the material that comprises the LED module 102).

The angle-edged cross-sections illustrated in FIGS. 2E and 2F may represent alternative embodiments to those illustrated in FIGS. 1A-1C and 2A-2C. More specifically, instead of curved peripheral portions 106, one or more LED modules 102 could instead have the angled ends illustrated in FIGS. 2E and 2F. In embodiments that include an optical coupler 230 frame, the cross-section of such a frame would be shaped to mate with the angled mating surfaces 260 of the LED modules 102.

Figure 2G:
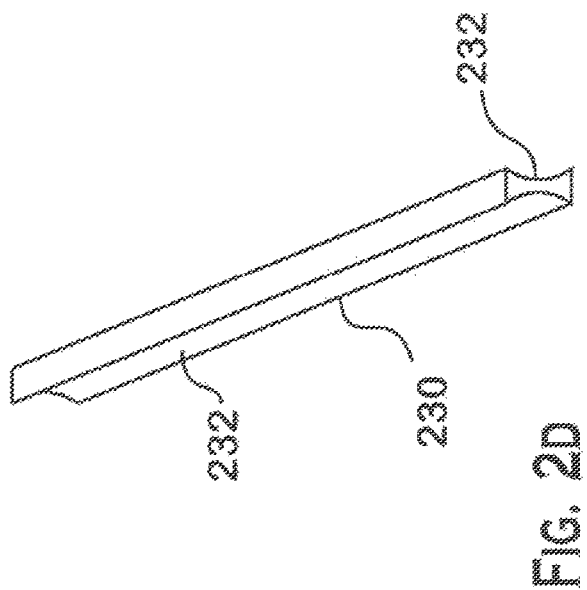
FIG. 2G illustrates a luminescing strip, according to an example.

In an alternative, the angle-edged cross-sections illustrated in FIGS. 2E and 2F are cross-sections of a luminescing strip 100(4) such as illustrated in FIG. 2G. The luminescing strip 100(4) includes two LED modules 102(5), each having a cross section as illustrated in FIG. 2E or 2F. The two LED modules 102 are joined at the mated overlap end 250. The strip 100 includes multiple LED packages 110 at different ends.

Figure 3:
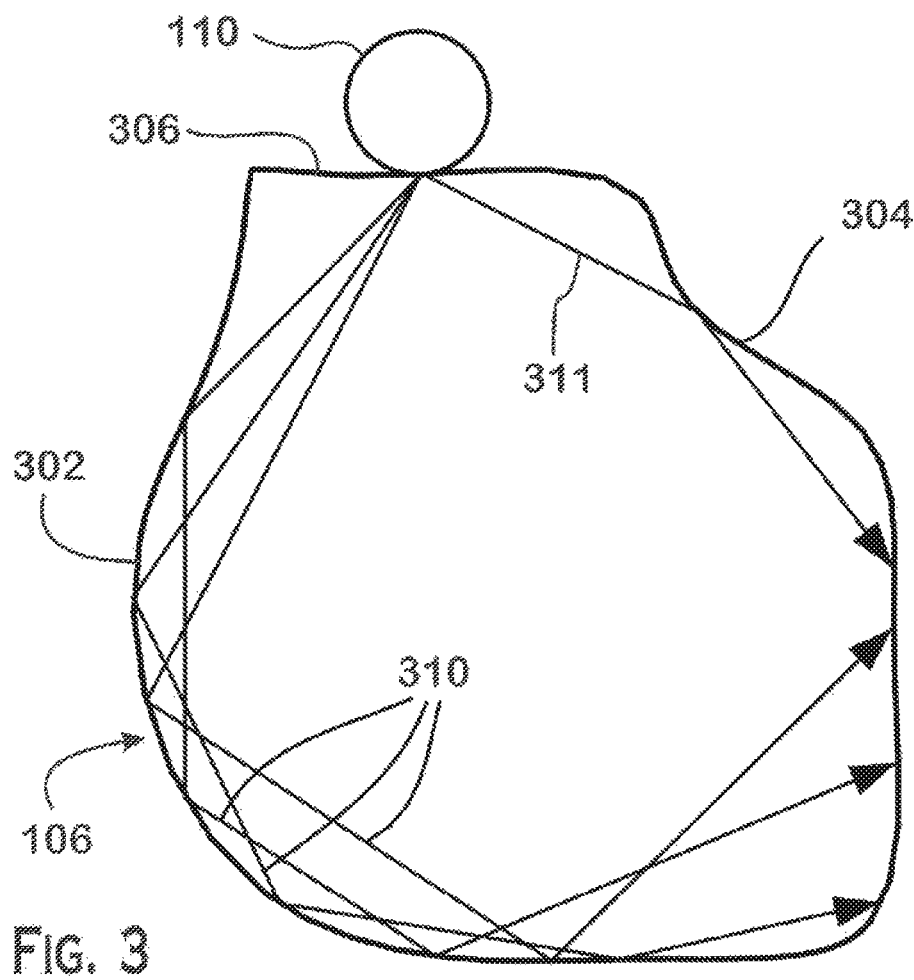
FIG. 3 is a cross-sectional detailed view of a curved edge of an LED module, according to an example.

FIG. 3 is a close-up of the curved peripheral portion 106 illustrated in other figures. The curved peripheral portion 106 has geometric features that serve to reflect light emitted from the LED package 110 into the body of the LED module 102 light guide and also to obscure the image of the LED package. An outward facing bulge 302 is shaped such that light emitted by the LED package 110 that is incident on the outward facing bulge 302 is reflected into the body of the LED module 102 (as illustrated by example light rays 310). Similarly, an inward facing shallow curve 304 is shaped so that light rays originating from the LED package 110 and incident on the inward facing shallow curve 304 are reflected into the body of the LED module 102. An optical coupling surface 306 on the top of the curved peripheral portion 106 is positioned and configured to in-couple light emitted by the LED package 110. The optical coupling surface 306 may have appropriate surface features, such as roughening, to allow for the in-coupling of light. The optical coupling surface 306 faces away from the bottom surface 113 of the LED module 102.

Figure 4:
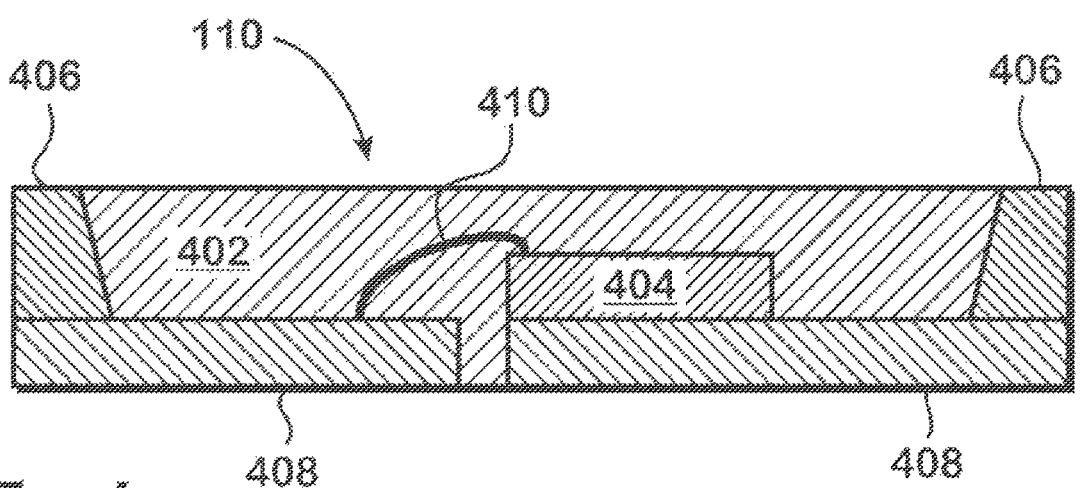
FIG. 4 is a cross-sectional view of an LED package, according to an example.

FIG. 4 is a cross-sectional illustration of an example LED package 110. As illustrated, the LED package 110 includes an LED chip 404 configured to emit light, a lead frame 408 that facilitates external electrical coupling to terminals of the LED chip 404, a molding 406 forming the space in which the LED chip 404 is disposed and an encapsulant 402 that provides physical protection to the LED chip 404. The LED package 110 illustrated in FIG. 4 is just an example and any other LED package may be included in any of the LED assemblies 100 described herein.

Having described the invention in detail, those skilled in the art will appreciate that, given the present disclosure, modifications may be made to the invention without departing from the spirit of the inventive concept described herein. In particular, different features and components of the different devices described herein may be used in any of the other devices, or features and components may be omitted from any of the devices. A characteristic of a structure described in the context of one embodiment, may be applicable to any embodiment. Therefore, it is not intended that the scope of the invention be limited to the specific embodiments illustrated and described.

What is claimed is:

1. A device, comprising:
a first waveguide including a first surface,
the first surface including a generally planar portion and a curved edge portion that adjoins the generally planar portion,
the curved edge portion being shaped such that when viewed in a cross-section that is substantially orthogonal to the generally planar portion and is substantially parallel to a surface normal at the curved edge portion:
the curved edge portion includes a convex portion,
the convex portion includes an arc,
the arc has a first internal location, spaced apart from opposing ends of the arc, at which the arc is orthogonal to the generally planar portion, and
the curved edge portion further includes a concave portion that adjoins the convex portion; and
a second waveguide positioned adjacent to the first waveguide, the second waveguide being shaped to include a second convex portion that faces the convex portion of the first waveguide.

2. The device of claim 1, wherein the first waveguide further includes an incident surface that adjoins the curved edge portion of the first surface and forms a corner with the concave portion.

3. The device of claim 2, wherein the incident surface is generally parallel to the generally planar portion of the first surface.

4. The device of claim 2, wherein the first waveguide further includes a second surface opposite the first surface, the second surface including a second generally planar portion that is generally parallel to the generally planar portion of the first surface.

5. The device of claim 4, wherein the second surface further includes a second curved edge portion that adjoins the incident surface.

6. The device of claim 5, wherein the second curved edge portion, when viewed in the cross-section, includes a second concave portion between the second generally planar portion and the incident surface.

7. The device of claim 2, further comprising a first light-emitting diode positioned to direct light substantially into the first waveguide through the incident surface, such that the curved edge portion of the first surface:
reflects via total internal reflection at least a portion of the light, and
directs the reflected portion toward the generally planar portion of the first surface.

8. The device of claim 7, wherein the generally planar portion of the first surface of the first waveguide is configured to allow at least a portion of the light within the generally planar portion to exit the first waveguide through the generally planar portion.

9. The device of claim 1, wherein:
the second waveguide includes a third surface and a fourth surface opposite the third surface,
the third surface includes a second generally planar portion that is generally parallel to the generally planar portion of the first surface of the first waveguide,
the third surface further includes a second curved edge portion that adjoins the second generally planar portion,
the second curved edge portion is shaped such that when viewed in a second cross-section that is substantially orthogonal to the second generally planar portion and is substantially parallel to a surface normal at the second curved edge portion:
the second curved edge portion includes the second convex portion,
the second convex portion includes a second arc, and
the second arc has a second internal location, spaced apart from opposing ends of the second arc, at which the second arc is orthogonal to the generally planar portion.

10. The device of claim 9, wherein the second internal location of the second convex portion faces the internal location of the convex portion.

11. The device of claim 9, wherein the second internal location of the second convex portion is adjacent to the internal location of the convex portion without any intervening optical elements disposed between the second internal location of the second convex portion and the internal location of the convex portion.

12. The device of claim 9, wherein the second internal location of the second convex portion directly abuts the internal location of the convex portion.

13. The device of claim 9, further comprising a frame element positioned between the convex portion of the first surface of the first waveguide and the second convex portion of the third surface of the second waveguide, the frame element having opposing concave surfaces that face the convex portion of the first surface of the first waveguide and the second convex portion of the third surface of the second waveguide.

14. The device of claim 9, wherein the curved edge portion extends generally parallel to the second curved edge portion along a direction that is substantially orthogonal to the cross-section.

15. The device of claim 9, wherein the curved edge portion and the second curved edge portion extend along respective lines that are generally parallel to each other.

16. The device of claim 9, wherein the first waveguide and the second waveguide are generally rectangular in shape.

17. A method, comprising:
directing light from a light emitting diode into an edge of a generally planar waveguide, the waveguide including a first surface, the first surface including a generally planar portion and a curved edge portion that adjoins the generally planar portion, the curved edge portion being shaped such that when viewed in a cross-section that is substantially orthogonal to the generally planar portion and is substantially parallel to a surface normal at the curved edge portion:
the curved edge portion includes a convex portion,
the convex portion extends to a location at which the convex portion is orthogonal to the generally planar portion,
the convex portion extends convexly beyond the location at which the convex portion is orthogonal to the generally planar portion, and
the curved edge portion further includes a concave portion that adjoins the convex portion;

reflecting, via total internal reflection from the curved edge portion of the first surface, at least a portion of the light from the edge of the waveguide toward an interior of the waveguide; and supporting the generally planar waveguide with a frame element, the frame element being positioned adjacent the convex portion and having a concave surface that faces the convex portion.

18. The method of claim 17, further comprising directing at least a portion of the light to exit the waveguide through the generally planar portion of the first surface of the waveguide.

19. A device, comprising:
a first waveguide including:
 a first generally planar exiting surface, the first generally planar exiting surface extending to a first curved portion that has a convex cross-sectional shape; and
 a first opposing surface opposite and generally parallel to the first generally planar exiting surface;
a second waveguide positioned adjacent the first waveguide and including:
 a second generally planar exiting surface generally coplanar with the first generally planar exiting surface, the second generally planar exiting surface extending to a second curved portion that has a convex cross-sectional shape,
 the second curved portion facing the first curved portion,
 the first curved portion and the second curved portion being spaced apart by a first distance at a first plane coincident with the first generally planar exiting surface,
 the first curved portion and the second curved portion being spaced apart by a second distance, less than the first distance, at a second plane that is parallel to the first plane and positioned between the first plane and the first opposing surface.

20. The device of claim 19, wherein the first curved portion and the second curved portion are spaced apart by a third distance, greater than the second distance, at a third plane positioned between the second plane and the first opposing surface.

* * * * *